United States Patent
Brems et al.

(10) Patent No.: US 11,231,827 B2
(45) Date of Patent: Jan. 25, 2022

(54) COMPUTING DEVICE AND EXTENDED REALITY INTEGRATION

(71) Applicant: QUALCOMM Incorporated, San Diego, CA (US)

(72) Inventors: Douglas Brems, San Diego, CA (US); Robert Tartz, San Marcos, CA (US); Robyn Teresa Oliver, Highland Park, IL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/741,617

(22) Filed: Jan. 13, 2020

(65) Prior Publication Data

US 2021/0034222 A1 Feb. 4, 2021

Related U.S. Application Data

(60) Provisional application No. 62/882,488, filed on Aug. 3, 2019.

(51) Int. Cl.
*G06F 3/0481* (2013.01)
*G06F 3/16* (2006.01)
(Continued)

(52) U.S. Cl.
CPC .......... *G06F 3/04815* (2013.01); *G06F 3/167* (2013.01); *G06T 19/006* (2013.01); *H04N 13/332* (2018.05)

(58) Field of Classification Search
CPC .................................................. G06T 19/006
See application file for complete search history.

(56) References Cited

U.S. PATENT DOCUMENTS

2015/0212918 A1* 7/2015 Cai ...................... G06F 11/1441
719/318
2016/0109937 A1* 4/2016 Kim ....................... G06F 3/147
345/156

(Continued)

FOREIGN PATENT DOCUMENTS

EP          3236423 A1    10/2017
KR     20180044687 A     5/2018
(Continued)

OTHER PUBLICATIONS

International Search Report and Written Opinion—PCT/US2020/037817—ISA/EPO—dated Sep. 23, 2020.

*Primary Examiner* — Phi Hoang
(74) *Attorney, Agent, or Firm* — QUALCOMM Incorporated

(57) ABSTRACT

Techniques are provided for integrating mobile device and extended reality experiences. Extended reality technologies can include virtual reality (VR), augmented reality (AR), mixed reality (MR), etc. In some examples, a synthetic (or virtual) representation of a device (e.g., a mobile device, such as a mobile phone or other type of device) can be generated and displayed along with VR content being displayed by a VR device (e.g., a head-mounted display (HMD)). In another example, content from the device (e.g., visual content being displayed and/or audio content being played by the device) can be output along with VR content being displayed by the VR device. In another example, one or more images captured by a camera of the device and/or audio obtained by a microphone of the device can be obtained from the device by a virtual reality device and can be output by the virtual reality device.

35 Claims, 12 Drawing Sheets

(51) Int. Cl.
    *G06T 19/00*    (2011.01)
    *H04N 13/332*   (2018.01)

(56) References Cited

U.S. PATENT DOCUMENTS

| | | | |
|---|---|---|---|
| 2017/0061700 A1* | 3/2017 | Urbach | G06F 3/04883 |
| 2017/0076502 A1* | 3/2017 | Chen | G06F 1/1626 |
| 2017/0308258 A1* | 10/2017 | Xu | G06T 7/70 |
| 2017/0364960 A1 | 12/2017 | Huang | |
| 2018/0095542 A1* | 4/2018 | Mallinson | G06F 1/163 |
| 2018/0095708 A1 | 4/2018 | Black et al. | |
| 2018/0160105 A1 | 6/2018 | Ross et al. | |
| 2019/0037166 A1* | 1/2019 | Davis | A45F 5/02 |
| 2019/0065026 A1 | 2/2019 | Kiemele et al. | |
| 2019/0304477 A1* | 10/2019 | Wojcieszak | H04W 28/0268 |
| 2019/0318501 A1* | 10/2019 | Balan | A63F 13/211 |
| 2020/0316462 A1* | 10/2020 | Raghoebardajal | A63F 13/26 |

FOREIGN PATENT DOCUMENTS

| | | |
|---|---|---|
| WO | 2016144560 A1 | 9/2016 |
| WO | 2019051495 A1 | 3/2019 |

\* cited by examiner

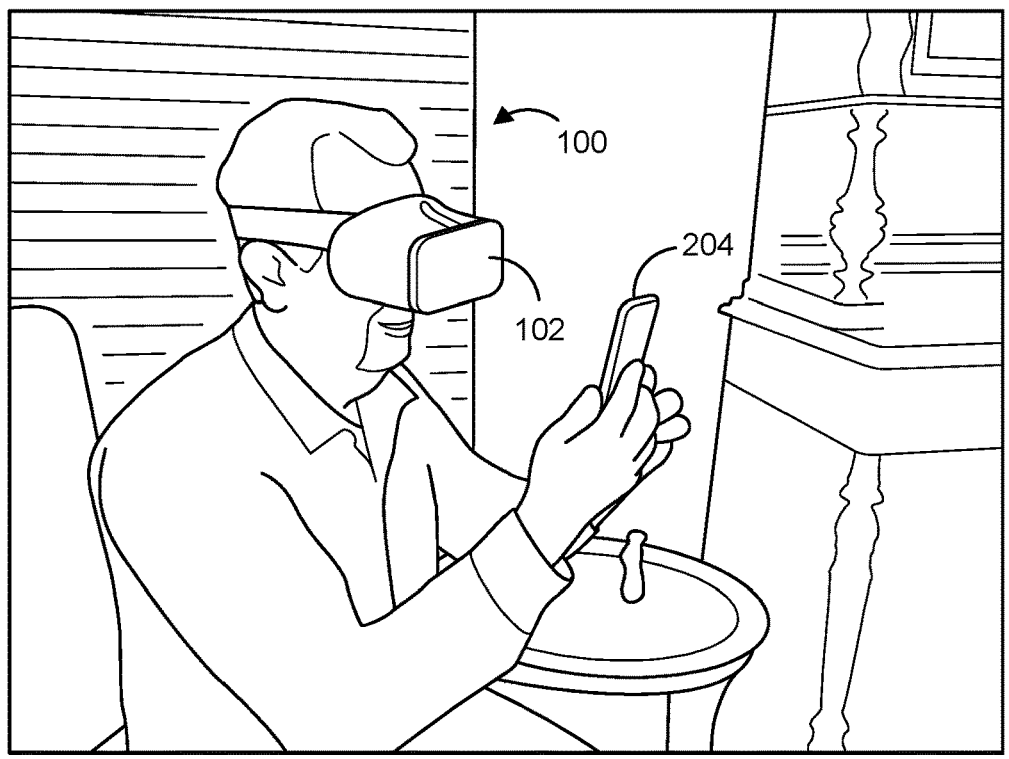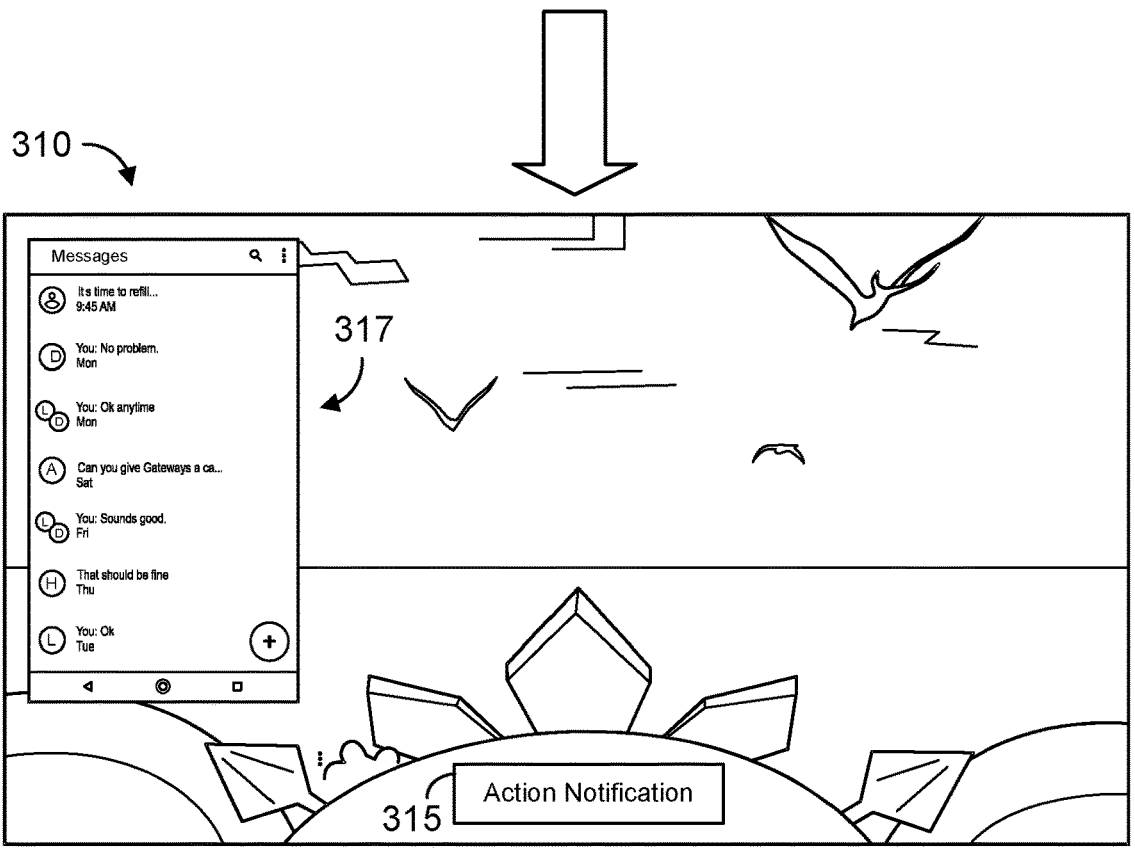
FIG. 3

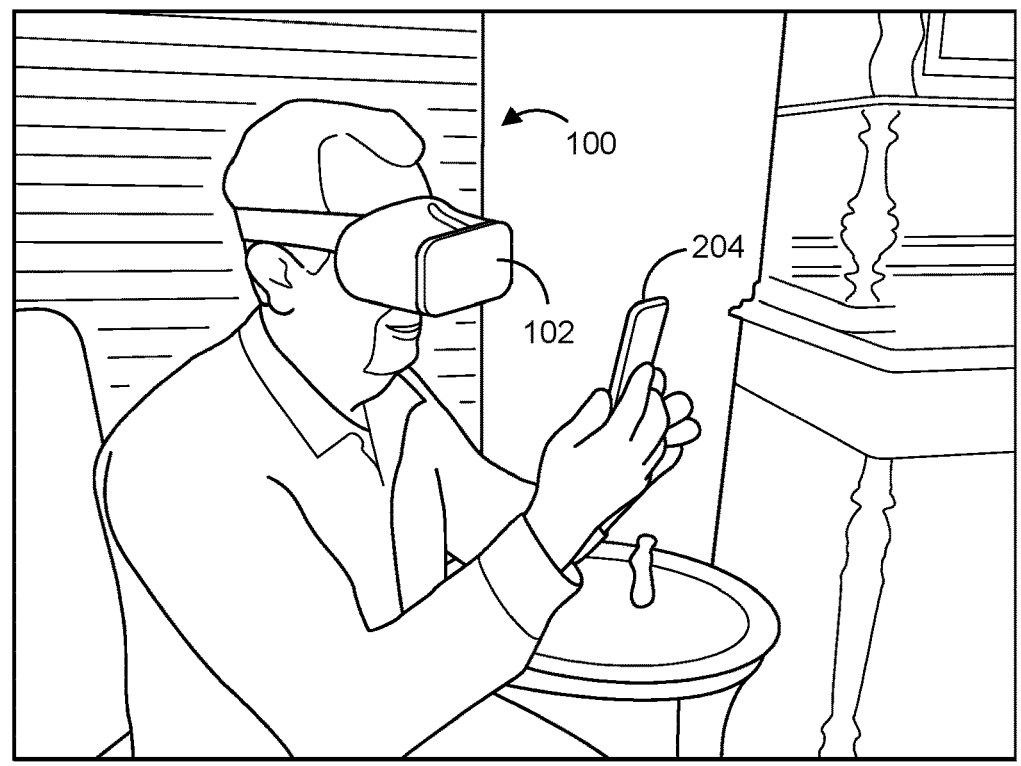
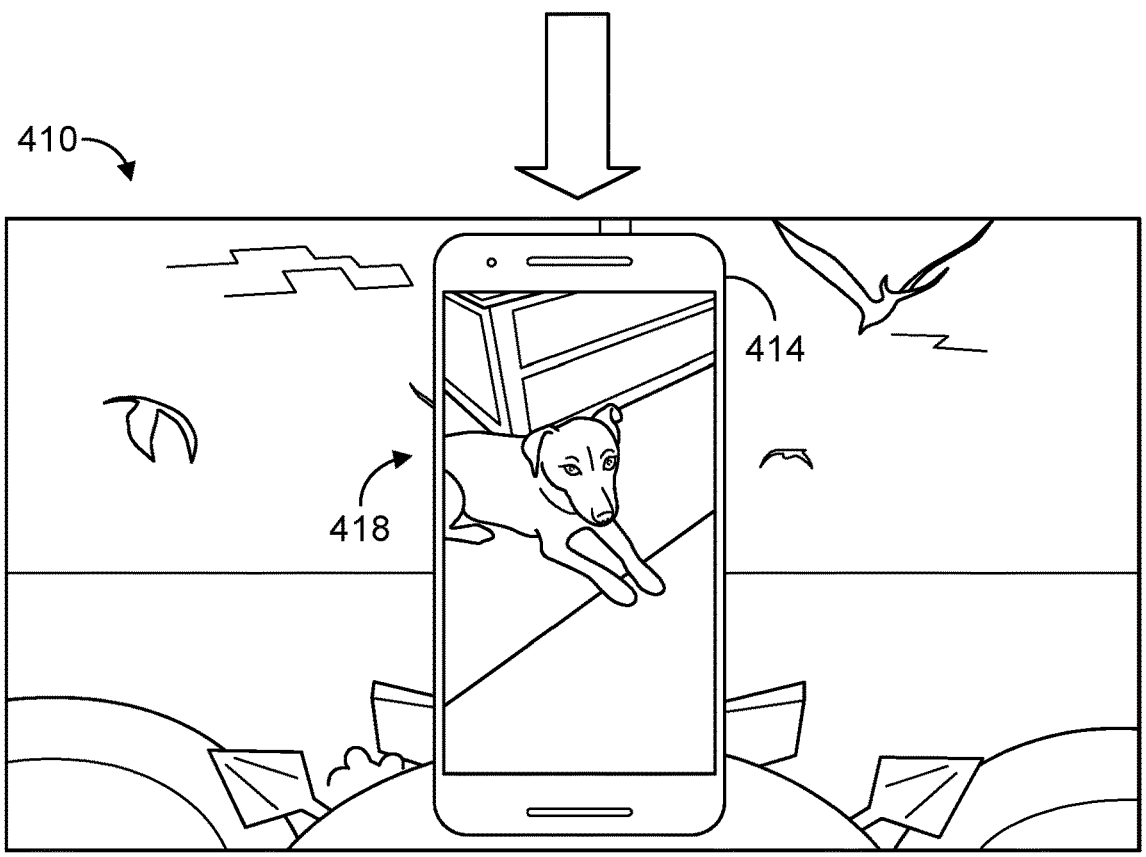
FIG. 4

900

```
┌─────────────────────────────────────────────┐
│ DISPLAY, BY A FIRST DEVICE, VIRTUAL REALITY CONTENT │
│                     902                     │
└─────────────────────────────────────────────┘
                      │
                      ▼
┌─────────────────────────────────────────────┐
│ GENERATE, BY THE FIRST DEVICE, A SYNTHETIC  │
│    REPRESENTATION OF A SECOND DEVICE        │
│                     904                     │
└─────────────────────────────────────────────┘
                      │
                      ▼
┌─────────────────────────────────────────────┐
│ DISPLAY, BY THE FIRST DEVICE, THE SYNTHETIC │
│ REPRESENTATION OF THE SECOND DEVICE WITH THE│
│              VIRTUAL CONTENT                │
│                     906                     │
└─────────────────────────────────────────────┘
```

COMPUTING DEVICE AND EXTENDED REALITY INTEGRATION

CROSS-REFERENCE TO RELATED APPLICATIONS

This application claims the benefit of U.S. Provisional Application No. 62/882,488, filed Aug. 3, 2019, which is hereby incorporated by reference, in its entirety and for all purposes.

TECHNICAL FIELD

The present disclosure generally relates to techniques and systems for providing an integration of computing device and extended reality experiences.

BACKGROUND

Extended reality technologies can be used to present virtual content to users, and/or can combine real environments from the physical world and virtual environments to provide users with extended reality experiences. The term extended reality can encompass virtual reality, augmented reality, mixed reality, and the like. Each of these forms of extended reality allows users to experience or interact with immersive virtual environments or content. For example, an extended reality experience can allow a user to interact with a real or physical environment enhanced or augmented with virtual content. Extended reality technologies can be implemented to enhance user experiences in a wide range of contexts, such as entertainment, healthcare, retail, education, social media, and so forth.

SUMMARY

In some examples, systems, methods, and computer-readable media are described for integrating computing device and extended reality experiences. For instance, the techniques described herein can allow a user enjoying an extended reality experience to seamlessly use a computing device (e.g., a mobile device, such as a mobile phone, a wearable device, or other type of device) or one or more functionalities of the computing device without interrupting the extended reality experience.

In one illustrative example, a synthetic (or virtual) representation of a user's computing device (e.g., a mobile device, such as a mobile phone, a wearable device, or other type of device) can be generated and displayed along with virtual reality content being displayed by a virtual reality device (e.g., a head-mounted display (HMD). In another example, content from the computing device (e.g., content being displayed by the device, a message received by the computing device, a notification generated by the computing device, and/or other content) can be displayed along with virtual reality content being displayed by the virtual reality device. In another example, audio content from the computing device (e.g., a voice message, a video message, browser content, a phone call, streamed or locally-stored music, and/or other audio content) can be played by the virtual reality device (e.g., through one or more speakers of the virtual reality device). In some cases, the audio content can be played by the virtual reality device while displaying visual content from the computing device. In such examples, a user can view the computing device and/or the content from the computing device along with the virtual reality content, allowing the user to interact with the computing device (e.g., control one or more applications of a mobile phone) without removing the virtual reality device (e.g., while still wearing the HMD). The virtual reality content can continue to be displayed by the virtual reality device as the synthetic representation of the computing device is displayed, or can be paused while the synthetic representation of the computing device is displayed by the virtual reality device.

In another illustrative example, one or more images captured by a camera of a computing device (e.g., a mobile device, such as a mobile phone, a wearable device, or other type of device) can be obtained from the device by a virtual reality device. The virtual reality device can display the one or more images along with virtual reality content being viewed through the virtual reality device (e.g., an HMD). In such an example, the user can view the real world (as captured by the one or more images) without removing the virtual reality device (e.g., while still wearing the HMD). In some cases, audio from the microphone of the computing device can be provided to the virtual reality device. For example, providing audio from the microphone of the computing device can allow the user to perceive what is going on in the real world without having to remove the virtual reality device.

According to one illustrative example, a method of determining one or more sizes of one or more objects is provided. The method includes: displaying, by a first device, virtual reality content; obtaining, by the first device, a synthetic representation of a second device; displaying, by the first device, the synthetic representation of the second device with the virtual reality content; receiving, by the first device, input requesting a change in functionality of the second device; and displaying, based on the input received by the first device, a change in the synthetic representation of the second device, the change in the synthetic representation of the second device representing the change in functionality of the second device.

In another example, an apparatus for determining one or more sizes of one or more objects is provided that includes a memory configured to store one or more images and one or more processors implemented in circuitry and coupled to the memory. The one or more processors are configured to and can: cause virtual reality content to be displayed on a display; obtain a synthetic representation of a device; cause the synthetic representation of the device to be displayed with the virtual reality content on the display; receive input requesting a change in functionality of the device; and based on the received input, cause a change in the synthetic representation of the device to be displayed on the display, the change in the synthetic representation of the device representing the change in functionality of the device In another example, a non-transitory computer-readable medium is provided that has stored thereon instructions that, when executed by one or more processors, cause the one or more processor to: cause virtual reality content to be displayed by the first device; obtaining, by the first device, a synthetic representation of a second device; cause the synthetic representation of the second device to be displayed with the virtual reality content; receiving, by the first device, input requesting a change in functionality of the second device; and based on the input received by the first device, cause a change in the synthetic representation of the second device to be displayed by the first device, the change in the synthetic representation of the second device representing the change in functionality of the second device.

In another example, an apparatus for determining one or more sizes of one or more objects is provided. The apparatus includes: means for displaying, by a first device, virtual reality content; means for obtaining, by the first device, a synthetic representation of a second device; means for displaying, by the first device, the synthetic representation of the second device with the virtual reality content; means for receiving, by the first device, input requesting a change in functionality of the second device; and means for displaying, based on the input received by the first device, a change in the synthetic representation of the second device, the change in the synthetic representation of the second device representing the change in functionality of the second device.

In some aspects, the synthetic representation of the second device includes a synthetic representation of a display of the second device, wherein content displayed by the second device is displayed in the synthetic representation of the display of the second device.

In some aspects, the method, apparatuses, and computer-readable medium described above further comprise: receiving, by the first device, an indication of one or more inputs processed by the second device; and displaying, based on the indication of the one or more inputs processed by the second device, an additional change in the synthetic representation of the second device, the additional change in the synthetic representation of the second device representing an additional change in functionality of the second device.

In some aspects, the synthetic representation of the second device is overlaid over the virtual reality content. In some aspects, the first device includes a virtual reality head mounted display. In some aspects, the second device includes a mobile device.

In some aspects, the method, apparatuses, and computer-readable medium described above further comprise: obtaining, by the first device, audio content from the second device; and playing, by the first device, the audio content from the second device.

In some aspects, the method, apparatuses, and computer-readable medium described above further comprise: obtaining, by the first device, audio content captured by a microphone of the second device; and playing, by the first device, the audio content.

In some aspects, the method, apparatuses, and computer-readable medium described above further comprise: obtaining, by the first device, one or more images captured by a camera of the second device; and displaying, by the first device, the one or more images with the virtual reality content. In some aspects, the one or more images are part of a video captured by the camera of the second device. In some aspects, the one or more images are displayed with the virtual reality content as part of the synthetic representation of the second device. In some aspects, the one or more images are displayed within a synthetic representation of a display of the second device.

In some aspects, the method, apparatuses, and computer-readable medium described above further comprise: obtaining, by the first device, audio content captured by a microphone of the second device; and playing, by the first device, the audio content while displaying the one or more images with the virtual reality content.

In some aspects, the method, apparatuses, and computer-readable medium described above further comprise: receiving a trigger; and displaying, based on receiving the trigger, the synthetic representation of the second device with the virtual reality content. In some aspects, the trigger is based on information received from the second device.

In some aspects, the method, apparatuses, and computer-readable medium described above further comprise: receiving a removal trigger; and removing, by the first device based on receiving the trigger, the synthetic representation of the second device from display.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 3 is a diagram illustrating an example of content of a device displayed with virtual content, where the content of the device and the virtual content are displayed by a virtual reality device, in accordance with some examples;

FIG. 4 is a diagram illustrating an example of an image captured by a device displayed with virtual content, where the image and the virtual content are displayed by a virtual reality device, in accordance with some examples;

FIG. 9 is a flow diagram illustrating an example of a process for displaying virtual content, in accordance with some examples;

DETAILED DESCRIPTION

Figure 1:
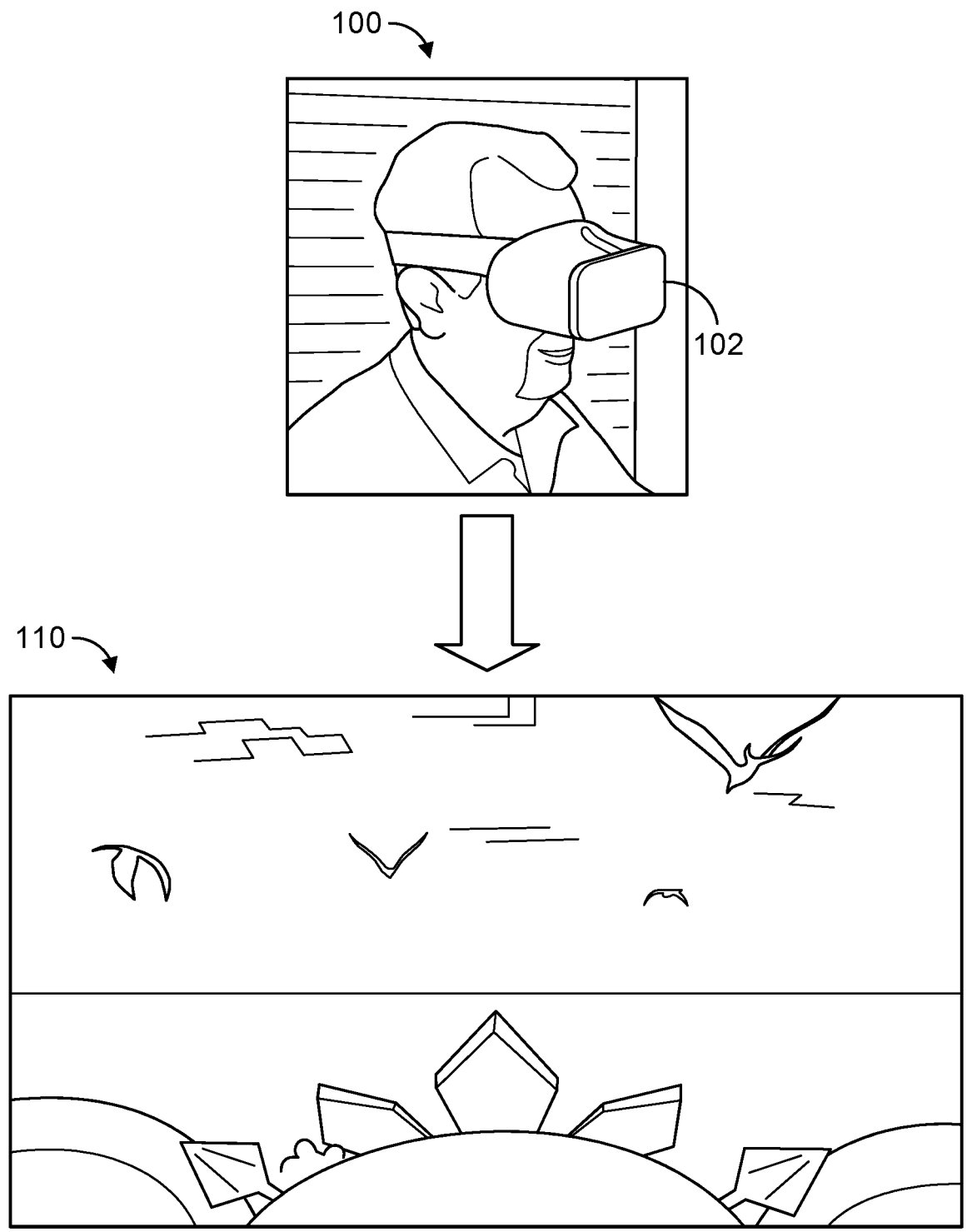
FIG. 1 is a diagram illustrating an example of virtual content displayed by a virtual reality device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously described, extended reality (XR) technologies can provide virtual content to a user, and/or combine real or physical environments and virtual environments (made up of virtual content) to provide users with extended reality experiences. Extended reality experiences include virtual reality (VR), augmented reality (AR), mixed reality (MR), and/or other immersive content. Examples described herein will use VR for illustrative purposes. However, one of ordinary skill will appreciate that the techniques described herein can be applied to other extended reality experiences, such as AR and MR. For example, in some cases, the techniques described herein can be used for AR devices and/or MR devices. An MR device can use video pass-through (e.g., as shown in and described below with respect to FIG. 5) to render physical reality along with virtual content. However, due to the poor quality of typical video pass-through devices, a user can see an outline of the user's phone if they hold the phone up to the MR device (e.g., an MR headset or head-mounted display), but may not be able to see/read the content due to resolution, distortion, flicker, and/or latency associated with the video pass-through. Using the techniques described below, the content can be easily viewed by the user on the MR device display (e.g., a display of an MR headset or head-mounted display).

VR describes a three-dimensional, sometimes computer-generated environment that can be interacted with in a seemingly real or physical way. As a user experiencing a VR environment moves in the real world, images rendered in the virtual environment also change, giving the user the perception that she/he is moving within the virtual environment. For example, a user can turn left or right, look up or down, and/or move forwards or backwards, thus changing the user's point of view of the virtual environment. The VR content presented to the user can change accordingly as the user moves, so that the user's experience is as seamless as in the real world. VR content can include VR video in some cases, which can be captured and rendered at very high quality, potentially providing a truly immersive virtual reality experience. VR applications include gaming, training, education, video (e.g., sporting events, movies, shows, among others), online shopping, remote operations (e.g., remote control of a robot, unmanned aerial vehicle, remote surgery, among others), and/or other applications.

Various devices can be used to render XR content. For example, VR content can be rendered and displayed using VR equipment, such as a head mounted display (HMD) or other VR headset, which fully covers a user's eyes during a VR experience. FIG. 1 is a diagram illustrating an example of virtual content displayed by a VR headset 102 being worn by a user 100. As shown, the user is fully immersed in a VR environment (as illustrated by a VR frame 110).

Because VR equipment can fully cover a user's eyes and in some cases the user's ears, the user can be unable to interact with other devices (e.g., a mobile phone) and/or the real-world while immersed in the virtual reality environment. For example, in some cases, the user's phone or other computing device can be used as a controller for a VR headset (or other VR device), but there is no ability for the user to interact with the phone's applications and/or other functionalities while immersed in the VR experience. Further, when using a VR headset, the user can feel vulnerable and out of touch with what is happening in the real-world environment around them. In some cases, the audio provided by a VR headset can prevent a user from hearing sounds from the outside world. When engaged in a VR experience, it would be beneficial to provide an easy way for a user to visually and/or audibly check what is happening in the real world, without removing the VR headset, and without pausing or stopping the virtual reality experience. While a VR headset can be removed (in which case the VR content may need to be paused or stopped) so that a user can check the physical surroundings and/or interact with another device, removal of the headset each time the user wants to view their phone (or other computing device) or check the environment can become tedious and can lead to a poor VR user experience.

Systems, methods, and computer-readable media are described herein for integrating computing device and extended reality experiences. As noted above, examples will be provided herein using VR as an example of a XR experience. However, one of ordinary skill will appreciate that the techniques described herein can apply to other types of XR experiences.

According to techniques described herein, a VR device can include multiple different operating modes. The VR device can include a VR headset, such as a head mounted display (HMD). The VR device can allow a user to toggle between the multiple modes without pausing or stopping a VR experience being displayed by the VR device. For instance, the various modes a user can toggle between include a regular VR mode (shown in FIG. 1, discussed above), a VR mode with a synthetic representation of an actual, real-life computing device and/or content from the computing device overlaid on top of the VR content (shown in FIG. 2 and FIG. 3, and discussed below), a VR mode with a peek of the outside world overlaid on top of the VR content (shown in FIG. 4 and discussed below), and/or a full switch between viewing VR content and viewing the real world environment through the VR device (shown in FIG. 5 and discussed below). The computing device can include a mobile device (e.g., a mobile phone, a tablet computer, or other mobile device), a wearable device (e.g., a smart watch, a heart rate monitor, or other wearable device), an Internet-of-Things (IoT) device, a remote controller (e.g., a television remote, or other remote controller), or other type of device.

The user can toggle between the different modes using one or more inputs. The input for switching to one or more of the modes can include any suitable input provided by a user, such as a voice input detected using an audio input device (e.g., a microphone) of the VR device and/or the computing device, a touch input on a touch interface of the VR device and/or the computing device, a gesture input detected using one or more sensors of the VR device and/or the computing device, a selection of a physical button of the VR device or computing device, a physical button on a VR controller device that can control the VR device, selection of an icon or virtual button displayed by the VR device or computing device (e.g., a user pressing an icon, a user gazing at an icon, as detected using gaze detection, or other type of selection), any combination thereof, and/or other input. An example of a touch input that can cause a mode change can include holding down a finger on a touchscreen of the computing device for a threshold amount of time, such as for one second, two seconds, or more seconds and/or with a certain amount of pressure (e.g., as measured by an accelerometer or other component that can measure pressure or force). Another example of a touch input can include a stroke gesture, which can include the user drawing a circle around the touchscreen with one stroke, and/or some other stroke gesture. Another example of a touch input can include a strong tap gesture on the touchscreen, which can include a finger tap on the touchscreen with a pressure or force above a force threshold (e.g., as measured by an accelerometer).

In some examples, a movement (e.g., acceleration, speed, etc.) of the computing device by more than a threshold amount can be detected and used to trigger one or more of the modes (e.g., the VR mode with the synthetic representation of an actual computing device and/or content from the computing device overlaid on top of the VR content, the VR mode with a peek of the outside world overlaid on top of the VR content, etc.). In some examples, the VR device can detect (e.g., using an outward-facing camera of the VR device, using an optical sensor, using motion detection, or other suitable technique) that a user has placed the phone in front of the VR device (e.g., the HMD), in which case the VR device can switch to one or more of the modes (e.g., the VR mode with the synthetic representation of an actual computing device and/or content from the computing device overlaid on top of the VR content, the VR mode with a peek of the outside world overlaid on top of the VR content, etc.).

In some examples, the VR device can detect user input using a 6-degrees of freedom (6DOF) input interface. XR devices, such as VR headsets, can constantly or periodically track their own location in the physical world in order to perform the VR functionalities. Such tracking can be referred to as inside-out 6DOF tracking—inside-out because the device can track itself without any external beacons or transmitters and 6DOF because the device can track its own position in terms of three rotational vectors (pitch, yaw, roll) and three translational vectors (up/down, left/right, forward/back). One or more sensors can be used to detect user input and/or perform tracking, such as one or more inertial measurement units (IMUs), one or more global positioning system (GPS) devices, one or more accelerometers, one or more gyroscopes, any combination thereof, and/or other sensors. In some cases, tracking can be accomplished with Visual Inertial Odometry (VIO), which is a process by which visual data (from one or more camera sensors) is fused together with inertial data (from gyroscopes and accelerometers) to measure a moved distance of the device in the physical world. VIO can be simultaneously used to determine a position (localization) of the device in the world and to map a scene (in the world) associated with the device.

Figure 2:
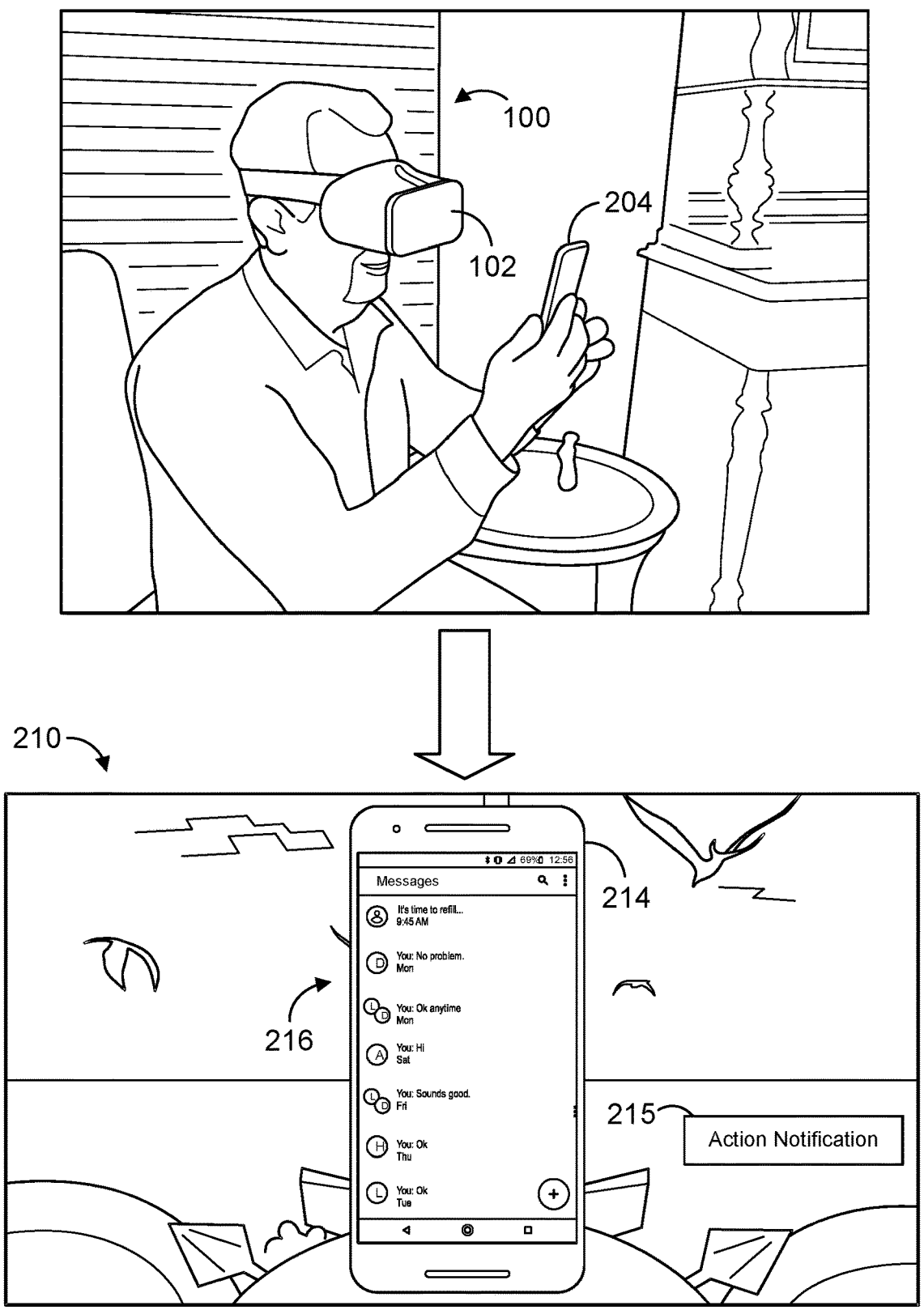
FIG. 2 is a diagram illustrating an example of a synthetic representation of a device displayed with virtual content, where the synthetic representation of the device and the virtual content are displayed by a virtual reality device, in accordance with some examples.

FIG. 2 is a diagram illustrating an example of a VR mode of a VR headset 102 that allows the VR headset 102 to display a synthetic representation 214 of an actual mobile device 204 (a physical device) overlaid on top of a frame 210 of VR content. As illustrated in FIG. 2, the synthetic representation 214 of the mobile device 204 includes a synthetic representation 216 of a display (or screen) of the mobile device 204. The content being displayed by the actual mobile device 204 in the real world is displayed as virtual content in the synthetic representation 216 of the display of the mobile device 204. In this VR mode, the user 100 can see a representation of the mobile device 204 display, presented by a display of the VR headset 102. In some examples, audio content from the mobile device 204 can be played by the VR headset 102 while displaying the synthetic representation 214 of the mobile device 204. For example, a voice message can be played when the user selects a voice messaging application on the mobile device 204. In other examples, a video (including the visual and audio portions of the video), a video message, audio from a web browser, a phone call, streamed music from a network location (e.g., from an Internet-based provider), locally-stored music (e.g., previously downloaded music), and/or other audio content can be played. The VR content can continue to be displayed by the VR headset 102 as the synthetic representation of the mobile device 204 is displayed and/or as the audio content is being played, or can be paused while the synthetic representation of the mobile device 204 is displayed and/or as the audio content is being played by the VR headset 102.

The user can interact with the actual mobile device 204 (without removing the VR headset 102 from the user's head) and can see everything that the mobile device 204 displays (and in some cases hear the audio being output by the mobile device 204), but inside of the VR headset 102. In some cases, the user can interact with the actual mobile device 204 using the input interface(s) of the mobile device 204 (e.g., the touchscreen, push buttons, voice input, touch hover feedback, etc.), and the change in functionality of the mobile device 204 will be displayed on the synthetic representation 216 of the display of the mobile device 204. In some cases, the user can interact with the mobile device 204 by providing input to the VR headset 102, such as using gesture input, gaze input, voice input, a VR remote controller, any combination thereof, and/or other suitable input that can be provided to the VR headset 102. In one illustrative example, the user 100 can provide a gesture input to the VR headset 102 including moving an index finger in a downward direction, which upon being detected by the VR headset 102, can cause the content displayed on the synthetic representation 216 of the display of the mobile device 204 to scroll in a downward direction. In another illustrative example, the user 100 can provide a gesture input the VR headset 102 including moving an index finger in a depth direction away from the VR headset 102 (e.g., as if the user is selecting an icon), which upon being detected by the VR headset 102, can cause an item of content displayed on the synthetic representation 216 of the display of the mobile device 204 to be selected. In another illustrative example, the user can interact with the mobile device 204 using a VR remote controller as a pointer.

An input (e.g., gestures, gaze, voice, etc.) causing a change in the content displayed on the synthetic representation 216 of the display of the mobile device 204 can also cause the content displayed by the actual mobile device 204 to change. In one illustrative example, selection of a messaging icon using a gesture detected by the VR headset 102 can cause a messaging application to be displayed on the synthetic representation 216 of the display of the mobile device 204 and on the display of the actual mobile device 204.

In some examples, user can interact with the actual mobile device 204 using touch hover feedback. For instance, the touch hover feedback can include the user holding a finger or thumb a certain distance (e.g., 0.5 centimeter (cm), 0.75 cm, 1 cm, 1.25 cm, or other suitable distance) from the physical display of the mobile device 204, and a display element (e.g., an icon, an item in a list, or other display element in the synthetic representation 216 of the display of the mobile device 204) corresponding to an item the finger or thumb is over can show a focus state in the synthetic representation 216 of the display of the mobile device 204 (e.g., the display element can be highlighted, made larger, and/or otherwise emphasized). Selection of the display element can then be performed by the user by selecting the highlighted display element (e.g., using a gesture input, gaze input, touch input, voice input, and/or other input, as described above). Touch hover feedback allows interaction with the synthetic representation 214 of the mobile device 204 to be more usable by allowing the user to position a finger correctly before making a selection. This can be especially helpful in the example shown in FIG. 2, where the user cannot directly view the mobile device 204 display in order to target a selection.

In some implementations, an action notification 215 can be displayed over the frame 210. The action notification 215 indicates to the user that an action has occurred at the mobile device 204. In some examples, the action notification 215 can include a notification that a message has been received by the mobile device 204 (e.g., a new text message has been received, a new email has been received, a notification of an incoming phone to the mobile device 204, a social media post has been notified by the mobile device 204, an emergency alert has been received by the mobile device 204, and/or other messages). In some examples, the action notification 215 can include the actual message that has been received. In some cases, a user can select the action notification 215 to cause the synthetic representation 214 of the mobile device 204 to be displayed (if not already displayed).

The synthetic representation 214 of the mobile device 204 can be generated by the VR headset 102 using various techniques. In one illustrative example, a user of the VR headset 102 can provide input indicating the type of the mobile device 204 being used (e.g., the make, model, and version of the mobile device 204, such as a Samsung™ Galaxy S10™), and the VR headset 102 can generate or obtain a virtual representation having the same features and dimensions as that type of mobile device. In another example, the VR headset 102 can capture one or more images of the mobile device 204, and the VR headset 102 can generate a virtual representation of the mobile device 204 using the one or more images.

The synthetic representation 214 of the mobile device 204 can be displayed in various locations in the VR coordinate system. For example, in some cases, the synthetic representation 214 may be displayed so as to appear in the actual real world location of the phone. In one illustrative example, if a user is holding the mobile phone in the user's right hand out in front of the user, the synthetic representation 214 of the mobile device 204 can be displayed in the bottom-right corner of the frame 210. In other examples, the synthetic representation 214 can be displayed on an edge of the frame 210 or another location in the frame 210 so that the synthetic representation 214 does not overlap with VR content and/or with a region of highest importance within the frame 210 (e.g., a center of the frame 210 corresponding to the field-of-view of the VR user). In some examples, the location at which the synthetic representation 214 of the mobile device 204 is displayed can be user selectable. For example, a user can indicate that the synthetic representation 214 is to be displayed in the top-left corner of the frames displayed by the VR headset 102.

In some cases, the content being displayed and/or audio content being output by the actual mobile device 204 can be transmitted or streamed to the VR headset 102, and the VR headset 102 can display the content in the synthetic representation 216 of the display of the mobile device 204. In some cases, the content being displayed by the mobile device 204 can be mirrored (e.g., using screen mirroring, such as Miracast using the peer-to-peer WiFi Direct standard or AirPlay) on the display of the VR headset 102.

Figure 6:
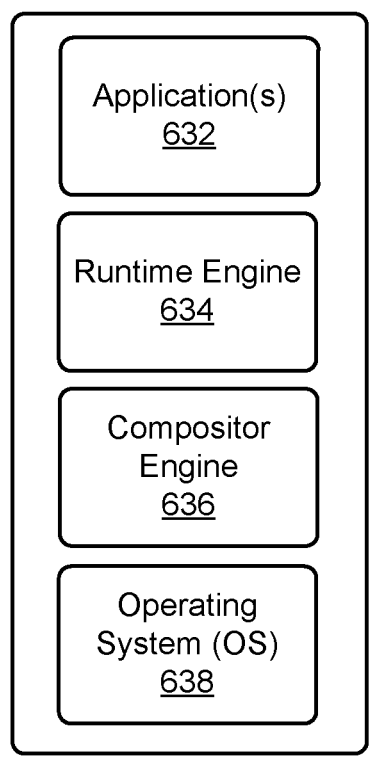
FIG. 6 is a diagram illustrating an example of components of a virtual reality device, in accordance with some examples.

FIG. 6 is a diagram illustrating an example of components of an XR device, such as a VR device (e.g., of VR headset 102 or other VR device), an MR device, and/or an AR device. The components operate to enable content being displayed and/or audio content being output by an actual mobile device 204 (e.g., mobile device 204) to be displayed by the XR device. The XR device can include one or more applications 632. An application can register for Runtime services (e.g., rendering and/or other Runtime services) provided by Runtime engine 634. The Runtime engine 634 can handle rendering for each display or graphic layer that can be displayed by the XR device. The Runtime engine 634 can also process head tracking pose and input events for each layer (e.g., controller, hand gesture, voice, and/or other input events). In some cases, the Runtime engine 634 can be part of an application from the one or more applications 632, part of the operating system (OS) 638, or can be combined with the compositor engine 636 in cases when the Runtime engine 634 coordinates XR activities which may include composition.

The compositor engine 636 can weave multiple graphic layers (e.g., windows, tiles, among others) together for viewing within an XR (e.g., a VR session). The compositor engine 636 can also perform processes XR-related processes, such as timewarp, spacewarp, among others. In some cases, the compositor engine 636 can be part of the Runtime engine 634, as described above, or can be part of the OS 638. The OS 638 can be any suitable OS, such as Android™ or other suitable OS.

Figure 7:
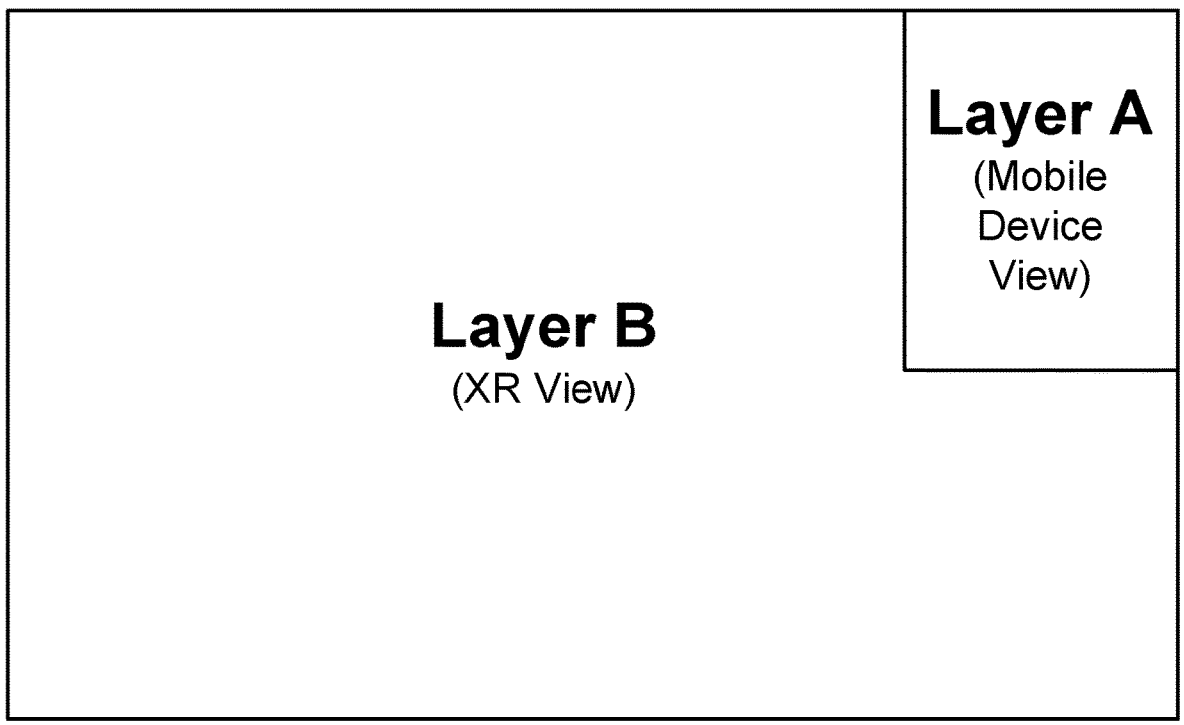
FIG. 7 is a diagram illustrating an example of different display layers, in accordance with some examples.

FIG. 7 is a diagram illustrating an example of different graphic layers that can be handled by Runtime engine 634. For example, the Layer A shown in FIG. 7 corresponds to the content being displayed by a mobile device (e.g., mobile device 204), and the Layer B corresponds to the XR content being displayed by the XR device (e.g., VR headset 102). VR content will be used as an example of XR content. However, one of ordinary skill will appreciate that the XR content can include MR content, AR content, and/or other content. The OS 638 (e.g., Android or other OS) can assign a mobile device user interface (UI) to one display (e.g., a primary display) and a VR view can be assigned to another display (e.g., a secondary display). The Runtime engine 634 can render the primary display assigned to the mobile device content as a layer (e.g., Layer A in FIG. 7), which can be viewed as a video stream on a secondary VR display rendered as another layer (e.g., Layer B in FIG. 7). The compositor engine 636 can weave together each layer so that the mobile device view layer (Layer A) appears in the foreground and the VR view layer (Layer B) runs in the background behind Layer A.

The Runtime engine 634 can handle input events (e.g., a controller, hand gesture, voice, etc.) from a layered VR session. For example, an input event selecting an item on the mobile device layer (Layer A) can cause the Runtime engine 634 to map the input event to a touch event, which is then passed back to the mobile device to be processed. In another example, an input event selecting an item on the VR layer (Layer B) can cause the Runtime engine 634 to pass the input event to the VR device to be processed.

Figure 8:
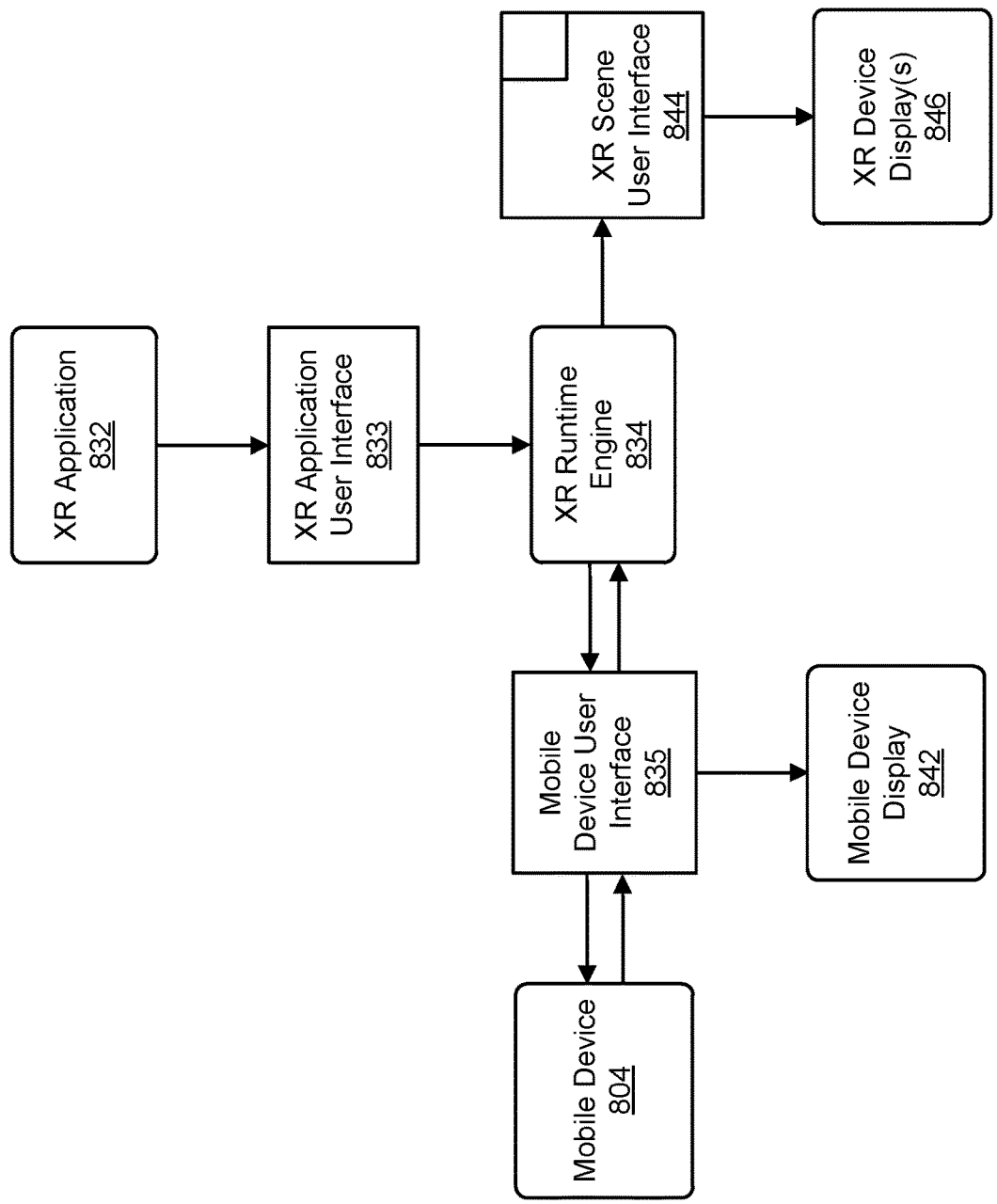
FIG. 8 is a diagram illustrating another example of components of a virtual reality device, in accordance with some examples.

FIG. 8 is a diagram illustrating another example of components of a virtual reality device. As shown, an XR application 832 controls an XR application user interface (UI) 833 of the XR application 832. A mobile device 804 controls a mobile device UI 835 of the mobile device 804. User input provided by a user to the mobile device 804 can be provided to the mobile device UI 835 by the mobile device 804. Similarly, user input provided by a user to the XR device can be provided to the XR application UI 833 by the XR device. Users can interact with the mobile device UI 835 and/or the XR application UI 833 using input devices, such as controllers, pointers, gaze, hand tracking input, voice, among others. An XR Runtime engine 834 can process the user inputs and can handle rendering for each graphic layer that can be displayed in the XR scene user interface 844 by the one or more XR device displays 846 of the XR device. The XR scene user interface 844 includes all content being displayed by the XR device, including the content of the XR application UI 833 and/or UIs of other XR applications on the XR device.

In some cases, mobile devices (e.g., mobile phones) can have multiple displays, which may support UI interactions (e.g., smartphone UI interactions) and display concurrently with XR application interactions and display. Content displayed by the mobile device 804 (e.g., a mobile device UI 835) on the mobile device display 84 can be represented in an XR scene user interface 844 in its entirety (e.g., all content displayed by a mobile device can be displayed with the XR content) or can be represented in component form (e.g., a single application UI or UI fragment of a single application UI can be displayed with the XR content).

The mobile device UI 835 can be visible on the mobile device display 842, on the one or more XR device displays 846, on both the mobile device display 842 and the one or more XR device displays 846, or on none of the displays. In some cases, the XR Runtime engine 834 can reside within or outside of the XR application 832. In some cases, the XR Runtime engine 834 can reside within or outside an OS, as described above. In some cases, the XR Runtime engine 834 can be co-resident on the mobile device and the XR device. In some cases, the XR Runtime engine 834 can reside on a connected device, such as an all-in-one VR headset that incorporates a mobile device. The connection between the XR device and the connected device can be wired or wireless (e.g., using WiFi, Bluetooth™, Zigbee™, or other wireless connection.

Using the mode shown in FIG. 2, the user 100 can view the mobile device 204 presented on a display of the VR headset 102 (and in some cases can hear audio content from the mobile device 204) while still viewing the VR content, and can interact with all of the functionalities of the mobile device 204 as if the user was interacting directly with the mobile device 204. In some cases, the VR content can continue playing while the user 100 is interacting with the mobile device 204. In some cases, the VR headset 102 can provide an option for the user 100 to pause the VR content while interacting with the mobile device 204. In either case, the user can interact with the mobile device 204, without the need to remove the VR headset 102.

FIG. 3 is a diagram illustrating an example of a VR mode of a VR headset 102 that allows the VR headset 102 to display content from the mobile device 204 overlaid on top of a frame 310 of VR content. The content being displayed by the actual mobile device 204 in the real world is displayed as virtual content 317 over the frame 310 of virtual content. In the VR mode, the user 100 can see what is being displayed by the mobile device 204, but without displaying a synthetic representation of the mobile device 204. The virtual content 317 can be displayed in various locations in the VR coordinate system. For example, in some cases, the virtual content 317 may be displayed so as to appear in the actual real world location of the phone. In other examples, the virtual content 317 can be displayed on an edge of the frame 310 (e.g., as shown in FIG. 3) or otherwise located in the frame 310 so that the virtual content 317 does not collide with VR content and/or with a region of highest importance (e.g., a center of the frame 310 corresponding to the field-of-view of the VR user). In some examples, the location at which the virtual content 317 is displayed can be user selectable.

In some examples, audio content from the mobile device 204 can be played by the VR headset 102 while displaying the content from the mobile device 204. The VR content can continue to be displayed by the VR headset 102 as the content from the mobile device 204 is displayed and/or as the audio content is being played, or can be paused while the content from the mobile device 204 is displayed and/or as the audio content is being played by the VR headset 102.

Similar to that described with respect to the mode shown in FIG. 2, the user can interact with the actual mobile device 204 (without removing the VR headset 102) and can see everything that is displayed by the phone, but inside of the VR headset 102. The user can interact with the actual mobile device 204 using the input interface(s) of the mobile device 204 and/or can interact with the mobile device 204 by providing input to the VR headset 102, similar to that described above with respect to FIG. 2.

The synthetic representation 214 of the mobile device 204 can be generated by the VR headset 102 based on input provided by a user indicating the type of the mobile device 204 being used, based on one or more images of the mobile device 204 captured by the VR headset 102, and/or using any other suitable technique. The content being displayed by the actual mobile device 204 can be transmitted or streamed to the VR headset 102, can be mirrored (e.g., using screen mirroring) on the display of the VR headset 102, or provided to the VR headset 102 using any other suitable technique.

Similar to that described with respect to FIG. 2, an action notification 315 can be displayed over the frame 310. The action notification 315 can indicate that an action has occurred at the mobile device 204, such as a message or phone call being received. In some examples, the action notification 315 can include the actual message that has been received. A user can select the action notification 315 to cause the virtual content 317 from the mobile device 204 to be displayed (if not already being displayed). For example, the messaging application from the mobile device 204 can be displayed on the VR device 102 in response to selection of the action notification 315.

Using the mode shown in FIG. 3, the user 100 can view content from the mobile device 204 presented on a display of the VR headset 102 while still viewing the VR content, and can interact with all of the functionalities of the mobile device 204 as if the user was interacting directly with the mobile device 204.

FIG. 4 is a diagram illustrating an example of a VR mode of a VR headset 102 that allows the VR headset 102 to provide a peek of the outside world by displaying one or more images (including image 418) captured by the mobile device 204 as an overlay overlaid on top of a frame 410 of VR content. The one or more images can be captured by a camera or multiple cameras of the mobile device 204, and can include one or more still images or a video including multiple consecutive images. In some cases, the camera of the mobile device 204 used to capture the one or more images can be the back-facing camera (located on the back side of the mobile device 204), and/or another camera of the mobile device 204 (e.g., a front-facing camera, a front-facing camera and a back-facing camera, multiple front-facing and/or back-facing cameras, or the like). The mobile device 204 can transmit the one or more images to the VR headset 102, which can then display the one or more images on the display of the VR headset 102. In some cases, audio from the microphone of the mobile device 204 can be provided to the VR headset 102, and the VR headset 102 can output the audio using one or more speakers of the VR headset 102. Providing audio from the microphone of the mobile device 204 can provide the user with more information to allow the user to perceive what is going on in the real world without having to remove the headset.

The example shown in FIG. 4 includes the image 418 displayed as part of a synthetic representation 414 of the mobile device 204. In some implementations, the one or more images captured by the mobile device 204 (including image 418) is displayed over the virtual content, in which case the synthetic representation 414 of the mobile device 204 is not displayed by the VR headset 102. In some implementations, the one or more images can be fully displayed on the display of the VR headset 102 (e.g., in full-screen mode), in which case no VR content is displayed by the VR headset 102 while the one or more images are displayed. In some implementations, the user 100 can control how much of the VR headset 102 display is used for displaying the one or more images.

Using the mode shown in FIG. 4, the user 100 can see a view of the real-world environment from a camera of the mobile device 204, presented on a display of the VR headset 102 while still viewing the VR content. As noted above, the user can also be provided with audio from a microphone of the mobile device 204, which can allow the user to hear any sounds that are occurring in the real-world environment. In some cases, the VR headset 102 can provide an option for the user 100 to pause the VR content while viewing the one or more images from the mobile device 204. In either case, the user can see a view of the real-world environment (and in some cases can hear what is happening in the real-world environment), without the need to remove the VR headset 102.

Figure 5:
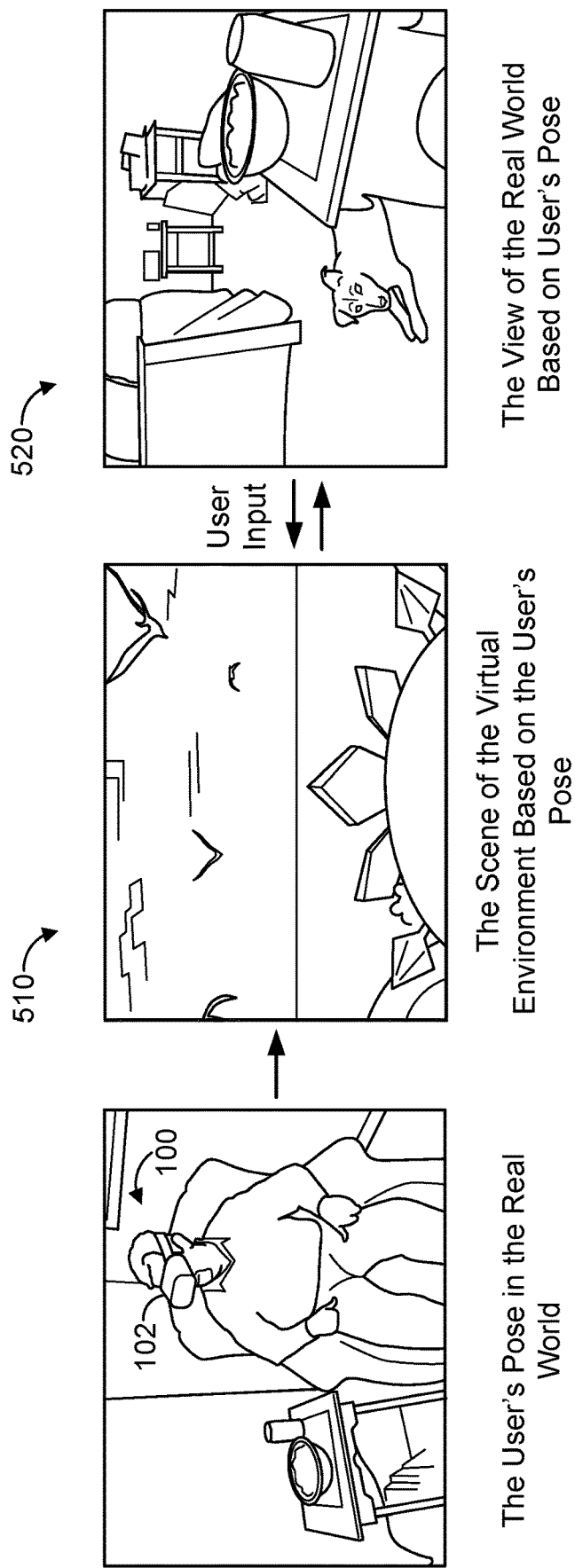
FIG. 5 is a diagram illustrating an example of switching between display of virtual content and display of a real world by a virtual reality device, in accordance with some examples.

FIG. 5 is a diagram illustrating an example of a VR mode of a VR headset 102 that allows the VR headset 102 to switch between the display of virtual VR content and the display of a real world. For example, frames (including a frame 510) of VR content can be displayed by the VR headset 102, which include a scene of a virtual environment based on the pose of the user. In response to user input, the VR headset 102 can switch to a real-world display mode and, once in the real-world display mode, can display a view (including frame 520) of the real-world environment based on the pose of the user.

In some cases, an external camera that is part of the VR headset 102 can be used to capture images of the real-world environment. The captured images can be displayed by the display of the VR headset 102 when the user switches to the real-world display mode. The captured images can include one or more still images, or a video including multiple consecutive images. The still image(s) or the video can be displayed until the user provides input instructing the VR headset 102 to switch back to the full VR mode where VR content is displayed without the one or more still images.

Using the mode shown in FIG. 5, the user 100 can toggle between a view of the VR world and the real-world environment where the user is located, with no need to take off the VR headset 102 in order to interact with the real-world environment. For example, the user 100 can be provided with a full view of a room the user 100 is sitting in, so that the user 100 can interact with objects in the room while still wearing the VR headset 102.

Examples of processes performed using the techniques described herein will now be described. FIG. 9 is a flowchart illustrating an example of a process 900 for displaying virtual content. At block 902, the process 900 includes displaying, by a first device, virtual reality content. The first device can include a virtual reality (VR) headset (e.g., an HMD or other type of VR headset), such as the VR headset 102 shown in FIG. 1-FIG. 5.

At block 904, the process 900 includes generating, by the first device, a synthetic representation of a second device. The second device can include a mobile device, such as the mobile device 204 shown in FIG. 1-FIG. 4. At block 906, the process 900 includes displaying, by the first device, the synthetic representation of the second device with the virtual content. In some examples, the synthetic representation of the second device is overlaid over the virtual content. For instance, using FIG. 2 as illustrative example, the synthetic representation 214 of the mobile device 204 is displayed along with a virtual content frame 210.

The synthetic representation of the second device (e.g., the synthetic representation 214 shown in FIG. 2) can include a synthetic representation of a display of the second device. Content displayed by the second device is displayed in the synthetic representation of the display of the second device. For instance, as shown in FIG. 2, the synthetic representation 214 of the mobile device 204 also includes a synthetic representation 216 of the display of the mobile device 204, and content being displayed by the mobile device 204 is shown in the synthetic representation 216 of the display of the mobile device 204.

In some cases, the process 900 can include displaying, based on an indication of one or more inputs processed by the second device, a change in the synthetic representation of the second device. The change in the synthetic representation of the second device represents a change in functionality of the second device. For example, a user can interact with the second device (e.g., a mobile device) in order to cause the second device to perform one or more functions (e.g., send a text message using a messaging application, post a message to a social networking account using a social networking application, send an email, among others). The change in content displayed by the second device based on the change in functionality of the second device can also be displayed as the change in the synthetic representation of the second device representing the change in functionality of the second device.

In some cases, the process 900 can include displaying, based on input received by the first device, a change in the synthetic representation of the second device. The change in the synthetic representation of the second device represents a change in functionality of the second device. For example, a user can interact with the first device (e.g., a VR headset) or the second device in order to cause the second device to perform one or more functions (e.g., send a text message using a messaging application, post a message to a social networking account using a social networking application, send an email, among others). The user can interact with the second device to cause the second device to perform the one or more functions using any suitable input, such as those described above (e.g., using the input interface(s) of the mobile device, by providing input to the VR headset, using touch hover feedback, or other suitable input). The change in content displayed by the second device based on the change in functionality of the second device can also be displayed as the change in the synthetic representation of the second device representing the change in functionality of the second device.

In some examples, the process 900 includes detecting a trigger, and displaying the synthetic representation of the second device (along with content displayed by the second device) in response to the trigger. In some cases, the trigger is based on information received from the second device. In one illustrative example, the information received from the second device includes a notification that a message has been received by the second device (e.g., that a new text message or email has been received), an input received by the second device (e.g., a user input provided to the second device), and/or other notification. In some cases, the trigger is based on the second device being moved by more than a threshold amount. For example, an accelerometer or other sensor of the second device can provide information indicating an amount of movement of the second device. In some cases, the trigger is based on detection of a gaze of a user directed toward the second device, as detected by the first device (e.g., using 6DOF tracking). In some cases, the trigger is based on an amount of time. For instance, the synthetic representation of the second device (along with content displayed by the second device) can be displayed by the first device with the virtual content at every threshold interval of time (e.g., every five minutes, every ten minutes, or other suitable time period) if no other trigger has been received. In some cases, the trigger is based on selection of an icon displayed with the virtual content. For example, the user can select the icon using a gesture, eye gaze, voice command, and/or other input. In some examples, trigger is based on voice input provided by a user. For instance, a user can say aloud "show my mobile device" or other phrase, which can be received as input by the first device and interpreted as a trigger causing the synthetic representation of the second device to be displayed. In some examples, the trigger is based on a user lifting the mobile device and/or unlocking the mobile device (e.g., via fingerprint input, by pressing hard button, via face recognition or face identification (ID), or using another mechanism for unlocking a device).

The synthetic representation of the second device can be removed from display by the first device based on various removal triggers. For example, a user can provide a touch input (e.g., a swipe input on a user interface), a voice input, a gaze input, a gesture input, and/or other input to the first device or the second device, which can be interpreted by the first device as a removal trigger that triggers the first device to remove the synthetic representation of the second device from being displayed. In another example, a removal trigger can be based on a user moving the second device to a particular point or using a particular motion (e.g., by lowering the device, as detected by an accelerometer or other sensor of the second device), causing the first device to remove the synthetic representation of the second device from display. In another example, the synthetic representation of the second device can be removed based on an amount of time since a last interaction with the second device. For example, if a threshold amount of time has passed since an input has been received from the second device or since the user has interacted with the synthetic representation of the second device, the synthetic representation can be removed from display. As a result of removing the synthetic representation of the second device from display, the virtual content will be displayed without the synthetic representation of the second device.

Figure 10:
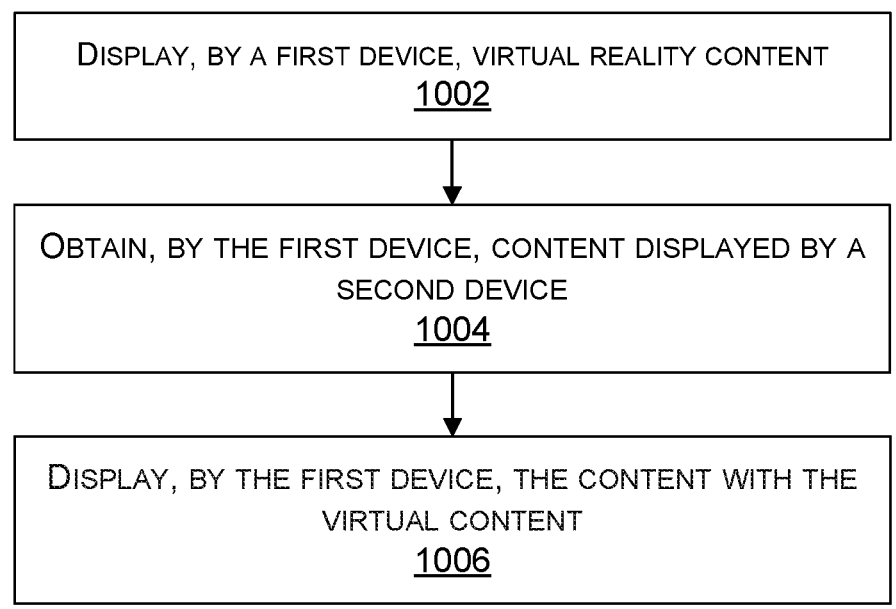
FIG. 10 is a flow diagram illustrating another example of a process for displaying virtual content, in accordance with some examples.

FIG. 10 is a flowchart illustrating another example of a process 1000 for displaying virtual content. At block 1002, the process 1000 includes displaying, by a first device, virtual reality content. The first device can include a virtual reality (VR) headset (e.g., an HMD or other type of VR headset), such as the VR headset 102 shown in FIG. 1-FIG. 5.

At block 1004, the process 1000 includes obtaining, by the first device, content displayed by a second device. The second device can include a mobile device, such as the mobile device 204 shown in FIG. 1-FIG. 4. At block 1006, the process 1000 includes displaying, by the first device, the content with the virtual content. In some cases, the content includes information from at least one application executed by the second device, such as an email application, a messaging application, a social networking application, a business application, a maps application, and/or other suitable application. In some examples, the content is overlaid over the virtual content. For instance, using FIG. 3 as illustrative example, the content displayed by the mobile device 204 is displayed as virtual content 317 over the frame 310 of virtual content. In some examples, a synthetic representation of the second device is overlaid over the virtual content, and the content can be displayed with the synthetic representation of the second device (e.g., as shown in FIG. 2).

In some cases, the process 1000 can include displaying, based on an indication of one or more inputs processed by the second device, a change in content of the second device. The change in the content represents a change in functionality of the second device. For example, a user can interact with the second device (e.g., a mobile device) in order to cause the second device to perform one or more functions (e.g., send a text message using a messaging application, post a message to a social networking account using a social networking application, send an email, among others). The change in content displayed by the second device based on the change in functionality of the second device can also be displayed as the change in the content representing the change in functionality of the second device.

In some examples, the process 1000 can include displaying, based on input received by the first device, a change in content of the second device. The change in content of the second device represents a change in functionality of the second device. For example, a user can interact with the first device (e.g., a VR headset) in order to cause the second device to perform one or more functions (e.g., send a text message using a messaging application, post a message to a social networking account using a social networking application, send an email, among others). The change in content displayed by the second device based on the change in functionality of the second device can also be displayed as the change in content of the second device representing the change in functionality of the second device.

In some examples, the process 1000 includes detecting a trigger, and displaying the content with the virtual content in response to the trigger. In some cases, the trigger is based on information received from the second device. In one illustrative example, the information received from the second device includes a notification that a message has been received by the second device (e.g., that a new text message or email has been received), an input received by the second device (e.g., a user input provided to the second device), and/or other notification. In some cases, the trigger is based on the second device being moved by more than a threshold amount. For example, an accelerometer or other sensor of the second device can provide information indicating an amount of movement of the second device. In some cases, the trigger is based on detection of a gaze of a user directed toward the second device, as detected by the first device. In some cases, the trigger is based on an amount of time. For instance, content from the second device can be displayed by the first device with the virtual content at every threshold interval of time (e.g., every five minutes, every ten minutes, or other suitable time period) if no other trigger has been received. In some cases, the trigger is based on selection of an icon displayed with the virtual content. For example, the user can select the icon using a gesture, eye gaze, voice command, and/or other input. In some examples, trigger is based on voice input provided by a user. For instance, a user can say aloud "show my mobile device" or other phrase, which can be received as input by the first device and interpreted as a trigger causing the content displayed by the second device to be displayed. In some examples, the trigger is based on a user lifting the mobile device and/or unlocking the mobile device (e.g., via fingerprint input, by pressing hard button, via face recognition or face identification (ID), or using another mechanism for unlocking a device).

The content displayed by the second device can be removed from display by the first device based on various removal triggers. For example, a user can provide a touch input (e.g., a swipe input on a user interface), a voice input, a gaze input, a gesture input, and/or other input to the first device or the second device, which can be interpreted by the first device as a removal trigger that triggers the first device to remove the content displayed by the second device from being displayed on the first device. In another example, a removal trigger can be based on a user moving the second device to a particular point or using a particular motion (e.g., by lowering the device, as detected by an accelerometer or other sensor of the second device). In another example, the content displayed by the second device can be removed based on an amount of time since a last interaction with the second device. For example, if a threshold amount of time has passed since an input has been received from the second device or since the user has interacted with the content from the second device being displayed by the first device, the content displayed by the second device can be removed from display on the first device. As a result of removing the content displayed by the second device from display, the virtual content will be displayed without the content displayed by the second device.

Figure 11:
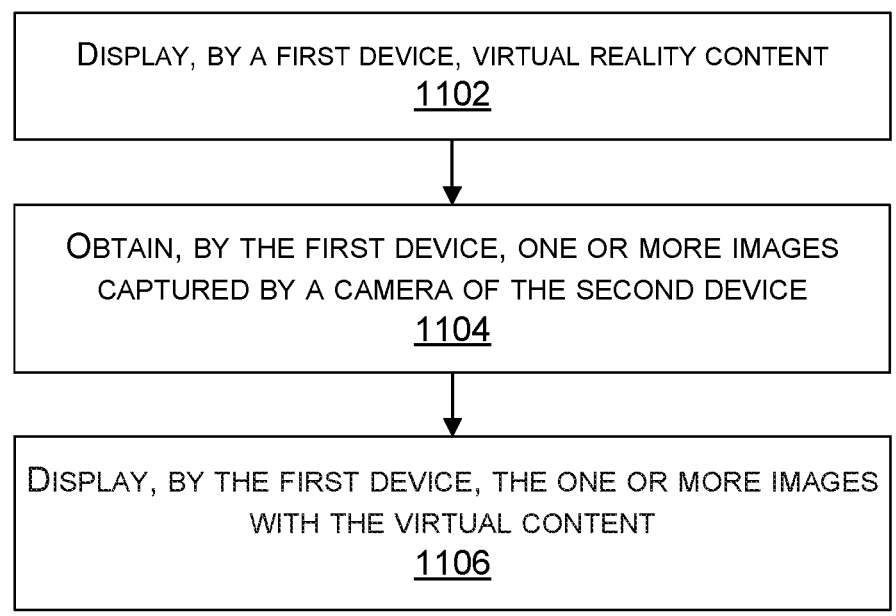
FIG. 11 is a flow diagram illustrating another example of a process for displaying virtual content, in accordance with some examples.

FIG. 11 is a flowchart illustrating another example of a process 1100 for displaying virtual content. At block 1102, the process 1100 includes displaying, by a first device, virtual reality content. The first device can include a virtual reality (VR) headset (e.g., an HMD or other type of VR headset), such as the VR headset 102 shown in FIG. 1-FIG. 5.

At block 1104, the process 1100 includes obtaining, by the first device, one or more images captured by a camera of a second device. The second device can include a mobile device, such as the mobile device 204 shown in FIG. 1-FIG. 4. At block 1106, the process 1100 includes displaying, by the first device, the one or more images with the virtual content. In some examples, the one or more images are overlaid over the virtual content. For instance, using FIG. 4 as illustrative example, an image 418 captured by the mobile device 204 is displayed along with a virtual content frame 410. In some examples, the one or more images include a video captured by the camera of the second device. In some examples, the one or more images include at least one still image captured by the camera of the second device.

In some implementations, the process 1100 includes displaying, using the first device, a synthetic representation of the second device with the virtual content. The one or more images can be displayed with the virtual content as part of the synthetic representation of the second device. For instance, the one or more images can be displayed within a synthetic representation of a display of the second device. In one example using FIG. 4 for illustrative purposes, a synthetic representation 414 of the mobile device 204 is shown with the image 418 displayed in a synthetic representation of a display representing the actual display of the mobile device 204.

Figure 12:
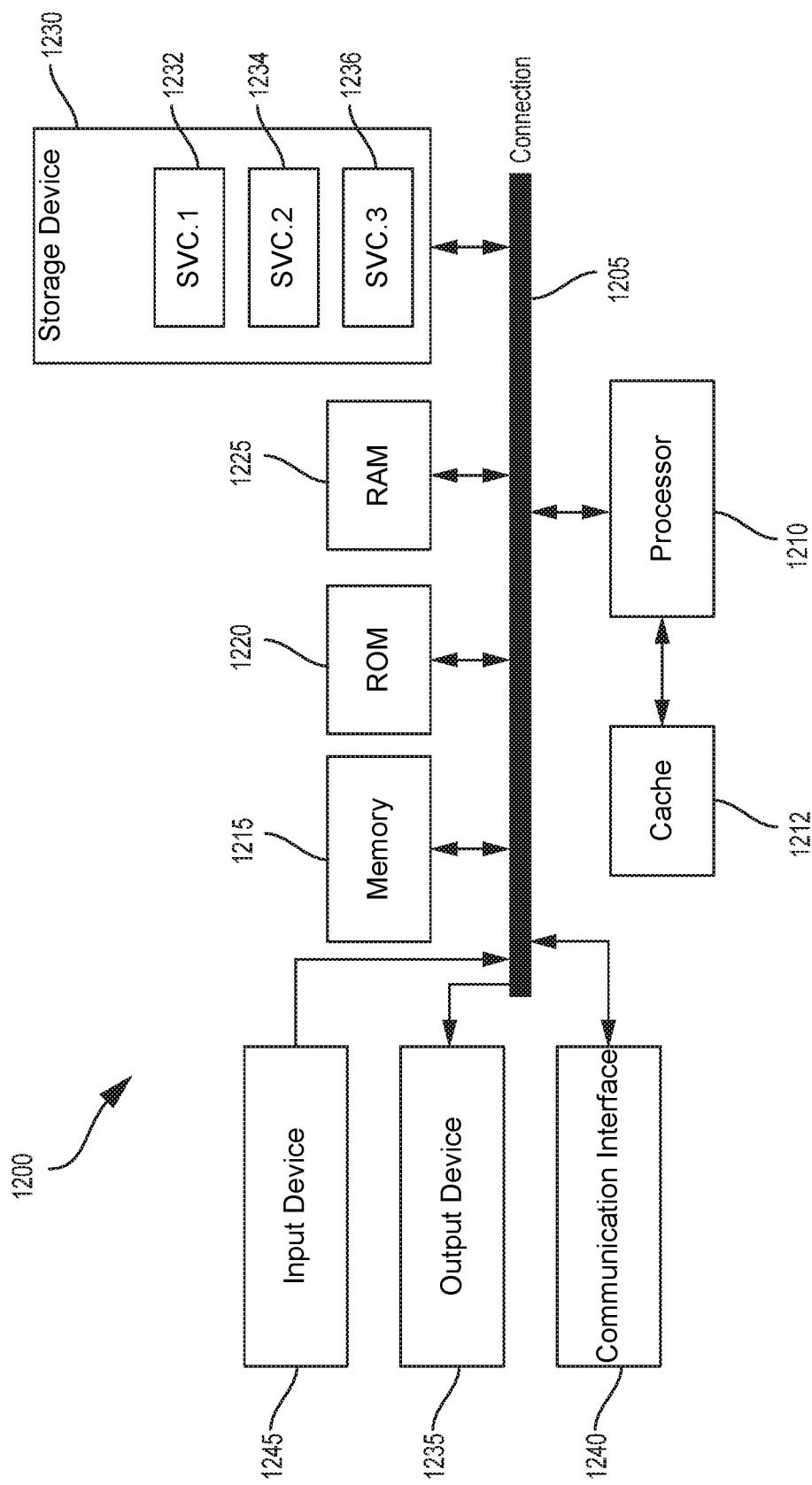
FIG. 12 is an example computing device architecture of an example computing device that can implement the various techniques described herein.

In some examples, the processes 900, 1000, and/or 1100 may be performed by a computing device or apparatus, such as a computing device having the computing device architecture 1200 shown in FIG. 12. In one illustrative example, the computing device (e.g., performing the processes 900, 1000, and/or 1100) can include an extended reality display device, such as a head mounted display (HMD) or other type of XR headset.

In some cases, the computing device or apparatus may include an input device, an output device, one or more processors, one or more microprocessors, one or more microcomputers, and/or other component(s) that is/are configured to carry out the steps of processes 900, 1000, and/or 1100. The components of the computing device (e.g., the one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The processes 900, 1000, and/or 1100 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 900, 1000, and/or 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 12 illustrates an example computing device architecture 1200 of an example computing device which can implement the various techniques described herein. The components of computing device architecture 1200 are shown in electrical communication with each other using connection 1205, such as a bus. The example computing device architecture 1200 includes a processing unit (CPU or processor) 1210 and computing device connection 1205 that couples various computing device components including computing device memory 1215, such as read only memory (ROM) 1220 and random access memory (RAM) 1225, to processor 1210.

Computing device architecture 1200 can include a cache of high-speed memory connected directly with, in close proximity to, or integrated as part of processor 1210. Computing device architecture 1200 can copy data from memory 1215 and/or the storage device 1230 to cache 1212 for quick access by processor 1210. In this way, the cache can provide a performance boost that avoids processor 1210 delays while waiting for data. These and other modules can control or be configured to control processor 1210 to perform various actions. Other computing device memory 1215 may be available for use as well. Memory 1215 can include multiple different types of memory with different performance characteristics. Processor 1210 can include any general purpose processor and a hardware or software service, such as service 1 1232, service 2 1234, and service 3 1236 stored in storage device 1230, configured to control processor 1210 as well as a special-purpose processor where software instructions are incorporated into the processor design. Processor 1210 may be a self-contained system, containing multiple cores or processors, a bus, memory controller, cache, etc. A multi-core processor may be symmetric or asymmetric.

To enable user interaction with the computing device architecture 1200, input device 1245 can represent any number of input mechanisms, such as a microphone for speech, a touch-sensitive screen for gesture or graphical input, keyboard, mouse, motion input, speech and so forth. Output device 1235 can also be one or more of a number of output mechanisms known to those of skill in the art, such as a display, projector, television, speaker device, etc. In some instances, multimodal computing devices can enable a user to provide multiple types of input to communicate with computing device architecture 1200. Communication interface 1240 can generally govern and manage the user input and computing device output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof. Storage device 1230 can include services 1232, 1234, 1236 for controlling processor 1210. Other hardware or software modules are contemplated. Storage device 1230 can be connected to the computing device connection 1205. In one aspect, a hardware module that performs a particular function can include the software component stored in a computer-readable medium in connection with the necessary hardware components, such as processor 1210, connection 1205, output device 1235, and so forth, to carry out the function.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials.

The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method comprising:
   displaying, by a first device, virtual reality content, the first device including a virtual reality head mounted display;
   displaying, by the first device, a synthetic representation of a second device located in the real-world, the synthetic representation of the second device being displayed with the virtual reality content in response to a first user input;
   receiving, by the first device, information relating to a change in functionality of the second device, wherein the information relating to the change in functionality of the second device is based on one or more inputs received and processed by the second device;
   displaying, based on the information received by the first device, a change in the synthetic representation of the second device, the change in the synthetic representation of the second device representing the change in functionality of the second device; and
   removing, by the first device based on a second user input received by the second device, the synthetic representation of the second device from display.

2. The method of claim 1, wherein the synthetic representation of the second device includes a synthetic representation of a display of the second device, wherein content displayed by the second device is displayed in the synthetic representation of the display of the second device.

3. The method of claim 1, wherein the second device includes a mobile device.

4. The method of claim 1, further comprising:
   obtaining, by the first device, audio content from the second device; and
   playing, by the first device, the audio content from the second device.

5. The method of claim 1, further comprising:
   obtaining, by the first device, audio content captured by a microphone of the second device; and
   playing, by the first device, the audio content.

6. The method of claim 1, further comprising:
   obtaining, by the first device, one or more images captured by a camera of the second device; and
   displaying, by the first device, the one or more images with the virtual reality content.

7. The method of claim 1, wherein the first user input is received by the first device.

8. The method of claim 7, wherein the first user input comprises a gesture input.

9. The method of claim 7, wherein the first user input comprises a voice command.

10. The method of claim 1, wherein the first user input is received by the second device.

11. The method of claim 10, wherein the first user input comprises a touch input.

12. The method of claim 10, wherein the first user input comprises a movement of the second device.

13. The method of claim 1, wherein the synthetic representation of the second device is displayed to appear over a location of the second device in the real-world.

14. The method of claim 1, wherein the synthetic representation of the second device is displayed at a static location relative to the virtual reality content.

15. The method of claim 1, wherein the one or more inputs received and processed by the second device include a user input.

16. The method of claim 1, wherein the one or more inputs received and processed by the second device include a notification.

17. A first device, comprising:
   a memory configured to store content for display; and
   one or more processors implemented in circuitry and coupled to the memory, the one or more processors being configured to:
   cause virtual reality content to be displayed on a display;
   cause a synthetic representation of a second device located in the real-world to be displayed, the synthetic representation of the second device being displayed with the virtual reality content on the display in response to a first user input;
   receive information relating to a change in functionality of the second device, wherein the information relating to the change in functionality of the second device is based on one or more inputs received and processed by the second device;
   based on the received information, cause a change in the synthetic representation of the second device to be displayed on the display, the change in the synthetic representation of the second device representing the change in functionality of the second device; and
   remove, based on a second user input received by the second device, the synthetic representation of the second device from display.

18. The first device of claim 17, wherein the synthetic representation of the second device includes a synthetic representation of a display of the second device, wherein content displayed by the second device is displayed in the synthetic representation of the display of the second device.

19. The first device of claim 17, wherein the first device includes a virtual reality head mounted display, the virtual reality head mounted display including the display.

20. The first device of claim 17, wherein the second device includes a mobile device.

21. The first device of claim 17, wherein the one or more processors are configured to:
   obtain audio content from the second device; and
   play the audio content from the second device.

22. The first device of claim 17, wherein the one or more processors are configured to:
   obtain audio content captured by a microphone of the second device; and
   play the audio content.

23. The first device of claim 17, wherein the one or more processors are configured to:
   obtain one or more images captured by a camera of the second device; and
   cause the one or more images to be displayed with the virtual reality content.

24. The first device of claim 17, wherein the first user input is received by the first device.

25. The first device of claim 24, wherein the first user input comprises a gesture input.

26. The first device of claim 24, wherein the first user input comprises a voice command.

27. The first device of claim 17, wherein the first user input is received by the second device.

28. The first device of claim 27, wherein the first user input comprises a touch input.

29. The first device of claim 27, wherein the first user input comprises a movement of the second device.

30. The first device of claim 17, wherein the synthetic representation of the second device is displayed to appear over a location of the second device in the real-world.

31. The first device of claim 17, wherein the synthetic representation of the second device is displayed at a static location relative to the display.

32. The first device of claim 17, wherein the one or more inputs received and processed by the second device include a user input.

33. The first device of claim 17, wherein the one or more inputs received and processed by the second device include a notification.

34. The first device of claim 17, wherein the second user input is received by the second device.

35. A non-transitory computer-readable storage medium storing instructions that when executed cause one or more processors of a first device to:
   cause virtual reality content to be displayed by the first device, the first device including a virtual reality head mounted display;
   cause a synthetic representation of a second device to be displayed located in the real-world with the virtual reality content, the synthetic representation of the second device being displayed in response to a first user input;
   receiving, by the first device, information relating to a change in functionality of the second device, wherein the information relating to the change in functionality of the second device is based on one or more inputs received and processed by the second device;
   based on the information received by the first device, cause a change in the synthetic representation of the second device to be displayed by the first device, the change in the synthetic representation of the second device representing the change in functionality of the second device; and
   remove, based on a second user input received by the second device, the synthetic representation of the second device from display.

* * * * *